United States Patent
Nawrocki et al.

(10) Patent No.: US 12,488,078 B1
(45) Date of Patent: Dec. 2, 2025

(54) REIMAGING ENDPOINT DEVICES, AND SECURELY MANAGING CREDENTIALS FOR THE SAME

(71) Applicant: Target Brands, Inc., Minneapolis, MN (US)

(72) Inventors: Adam Nawrocki, Plymouth, MN (US); David Pankratz, Minneapolis, MN (US); Dylan Essing, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 40 days.

(21) Appl. No.: 18/757,713

(22) Filed: Jun. 28, 2024

(51) Int. Cl.
*G06F 8/61* (2018.01)
*G06F 21/32* (2013.01)

(52) U.S. Cl.
CPC .............. *G06F 21/32* (2013.01); *G06F 8/63* (2013.01)

(58) Field of Classification Search
CPC .............. G06F 8/63; G06F 8/71; G06F 8/61
See application file for complete search history.

(56) References Cited

U.S. PATENT DOCUMENTS

| | | | |
|---|---|---|---|
| 8,321,682 B1 | 11/2012 | Read et al. | |
| 9,071,807 B2 | 6/2015 | Billau et al. | |
| 10,361,868 B1 | 7/2019 | Baker et al. | |
| 12,174,961 B2 * | 12/2024 | Terpstra | G06F 8/63 |
| 12,348,646 B2 * | 7/2025 | Lande Blau | G06F 9/45558 |
| 2017/0147361 A1 * | 5/2017 | Kirvan | G06F 9/44505 |
| 2018/0203719 A1 * | 7/2018 | Zhang | G06F 3/0647 |
| 2021/0099479 A1 * | 4/2021 | Prusov | H04L 63/1425 |
| 2023/0244466 A1 * | 8/2023 | Shah | G06F 9/541 717/178 |
| 2024/0427590 A1 * | 12/2024 | Abbott | G06F 8/65 |
| 2025/0123828 A1 * | 4/2025 | Harshavardhana | G06F 8/63 |

OTHER PUBLICATIONS

Joint NEMA/COCIR/JIRA Security and Privacy Committee (SPC), "Break-Glass—An Approach to Granting Emergency Access to Healthcare Systems", Dec. 2004, 6 pages.

(Continued)

*Primary Examiner* — Chris Parry
*Assistant Examiner* — Abderrahmen Chouat
(74) *Attorney, Agent, or Firm* — Barnes & Thornburg LLP

(57) ABSTRACT

In some implementations, a system for securely and automatically provisioning endpoint devices includes an administrative API that generates a token, an OS image repository that stores and makes available over a network an image of an operating system ("OS") that includes the token, a central endpoint manager that provides the OS, a secure credential repository that securely maintain credentials, and an endpoint device. The endpoint device includes a current OS image and read-only boot code. The read-only boot code obtains and installs a new OS image from the OS image repository, generates a new password and a new fingerprint for the new OS image, and transmits new OS installation data for the endpoint device to the administrative API. The administrative API validates the new OS installation data and performs a write-only operation to store the new password in the secure credential repository.

20 Claims, 7 Drawing Sheets

(56) References Cited

OTHER PUBLICATIONS

Jiri Formacek, "Local Administrator Password Management Detailed Technical Specification", Microsoft Corporation, Jun. 2015, 20 pages.
"Key management for builds for embedded systems", Sep. 8, 2019, accessed at https://security.stackexchange.com/questions/216742/key-management-for-builds-for-embedded-systems on Jun. 27, 2024, 3 pages.
"Zoho Vault Password Management Software", accessed at https://www.zoho.com/vault/enterprise-password-manager-guide.html on Jun. 27, 2024, 30 pages.

* cited by examiner

REIMAGING ENDPOINT DEVICES, AND SECURELY MANAGING CREDENTIALS FOR THE SAME

TECHNICAL FIELD

This specification generally relates to reimaging endpoint devices, and securely managing credentials for the endpoint devices.

BACKGROUND

Reimaging is a process for wiping an installed operating system (and other software) from a computing device, and installing a new operating system (and possibly, other software) on the device. In general, reimaging is performed when the operating system has become old, corrupted, subjected to computer viruses, and/or is suspected of being susceptible to a security breach. Runtime images can be developed that include an operating system and other software, to facilitate the reimaging process.

Computing devices can grant administrative privileges through the use of root passwords. In general, such administrative privileges can include user account changes, modifications to applications (e.g., installing applications, modifying installed applications, removing applications, etc.), and access to processes that may not be available to regular users. Root passwords are generally determined after performing a device setup.

SUMMARY

This document generally describes computer systems, processes, program products, and devices for reimaging endpoint devices, and securely managing credentials for the endpoint devices. In general, immutability in the context of an endpoint device (e.g., a point of sale (POS) device in a retail environment, or another sort of terminal device) can refer to a configuration of an operating system and applications of the endpoint device. Immutability can generally be ensured by limiting human interaction with the endpoint device to interactions that are provided through user interfaces of the applications that are executed by the device. For example, a runtime image employed by the endpoint device can include a device operating system, and various software applications to be used by device operators. Operational support for the endpoint device can be provided through a centralized management tool that enforces the reimaging of the endpoint device after support has been provided. Privileged access to the endpoint device can generally be limited to debug and/or security investigation activities, which can be controlled and audited. As part of granting privileged access to the endpoint device, various mechanisms can be provided for ensuring that no operators can access the root credential of the device that may be used to alter the configuration of the device in production. The root credential can be randomly generated at build time, and vaulted in a secret store with the intention of only accessing the credential under controlled scenarios. After privileged access to an endpoint has been granted, an event can trigger a reimaging of the endpoint at an operationally appropriate time, thus reducing the likelihood that the root credential is maliciously used.

In some implementations, a system for securely and automatically provisioning endpoint devices can include an administrative API that is configured to generate a token; an OS image repository that is configured to store and make available an immutable image of an operating system ("OS") that includes the token generated by the administrative API accessible over a network; a central endpoint manager that is configured to manage access to and provisioning of the OS; a secure credential repository that is configured to securely maintain credentials; and an endpoint device that includes memory and one or more processors. The memory includes a current OS image and read-only boot code. The read-only boot code is configured to be executed automatically on booting of the endpoint device and, when executed, performs operations comprising: obtaining a new OS image from the OS image repository, where the new OS image includes an associated token; installing the new OS image, including replacing the current OS image with the new OS image in the memory; generating a new password and a new fingerprint for the new OS image installed on the endpoint device, where the new fingerprint replaces a current fingerprint in the memory; and transmitting new OS installation data for the endpoint device to the administrative API, where the new OS installation data includes the new password, the associated token, and a unique identifier for the endpoint device. The administrative API is configured (i) to validate the new OS installation data with the OS image repository and (ii) to perform a write-only operation to store the new password in the secure credential repository upon validation by the OS image repository.

Other implementations of this aspect include corresponding methods, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. Upon booting of the endpoint device, the central endpoint manager can automatically poll with a unique identifier for the endpoint device when booted. Endpoint image information can be received from the central endpoint manager. A determination of whether to obtain the new OS based on the endpoint image information can be performed, and the new OS can automatically be obtained based on the determination. The memory of the endpoint device can include the current fingerprint for the current OS image. The endpoint image information can include the new fingerprint for the new OS image. Determining whether to obtain the new OS can include comparing the current fingerprint for the current OS image and the new fingerprint for the new OS image. The new OS image can be obtained in response to the current fingerprint being determined as different from the new fingerprint. The endpoint image information can include a flag directing installation of the new OS image. Determining whether to obtain the new OS can include automatically obtaining the current OS image including the flag. The new OS image and the current OS image can be a same OS version, and the installation of the new OS image can include a reimaging of the OS version for the endpoint device to an immutable image of the OS version represented by the new OS image. The central endpoint manager can maintain a repository of flags for the endpoint device and other endpoint devices that direct automatic reimaging of the OS version on the next boot. The endpoint device can be flagged for automatic reimaging with the central endpoint manager in response to a password for the endpoint device being accessed from the secure credential repository. The endpoint device can be flagged for automatic reimaging with the central endpoint manager in response to the current fingerprint for the current OS image changing. The new OS image and the current OS image can be different OS versions, and installation of the new OS image can include changing to a newer OS version for the endpoint device represented by the new OS image. The system can include a development platform that is configured to build the immutable image of the OS that includes, at least, OS code and the token generated by the administrative API. The unique identifier for the endpoint device can include a MAC address for the endpoint device. The secure credential repository can include memory and one or more processors, the memory can include includes write-only memory that is configured to store the new password, and the one or more processors of the secure credential repository can be configured to only permit access to the write-only memory storing the new password through a break the glass operation. Performance of the break the glass operation to access the new password for the endpoint device can cause the endpoint device to be flagged for reimaging with the central endpoint manager. The administrative API can be configured to perform the write-only operation in response to the new OS installation data being validated with the OS image repository. The OS image repository can be configured to: receive a request for validation of the new OS installation data, where the new OS installation data includes at least the associated token, compare the associated token with the stored token that was generated by the administrative API, and transmit confirmation of validation to the administrative API based on, at least, the comparison of the associated token and the stored token. The OS image repository can be further configured to: store the new fingerprint in association with the new OS image, and provide the new fingerprint for validating that the new OS image installed on the endpoint device has not changed. The new password can be stored only on the endpoint device and the secure credential repository. The endpoint device can include a point of sale terminal in a retail environment. The endpoint device can be further configured to automatically reboot on a recurring period of time, prompting performance of the operations during each reboot.

The systems, devices, program products, and processes described throughout this document can, in some instances, provide one or more of the following advantages. Separate application programming interfaces (APIs) can be maintained for handling requests from particular computing devices (or types of computing devices), thus maintaining a separation of functionality and data can be maintained throughout the system, thereby simplifying access to the APIs and improving system security. Mechanisms are provided for securing a root password and potentially never revealing the root password to a human (unless explicitly requested by an authorized operator), thereby improving the security of endpoint devices in the system. A request for retrieving a root password of an endpoint device can be handled through a different mechanism than the request for storing the password, thus ensuring password security. To ensure that the root password is not maliciously used after access to the password has been acquired, a reimaging of the endpoint device can be automatically triggered when the endpoint device is rebooted.

Other features, aspects and potential advantages will be apparent from the accompanying description and figures.

DESCRIPTION OF DRAWINGS

Like reference symbols in the various drawings indicate like elements.

DETAILED DESCRIPTION

FIGS. 1A-1E depict an example illustrative system 100 and process for generating endpoint images, reimaging endpoint devices, and securely managing credentials for the endpoint devices. In the present example, the illustrative process is shown in stages (A) to (Z), which may occur in the illustrated sequence, or which may occur in a sequence that is different than in the illustrated sequence. In some examples, two or more stages (A) to (Z) may be concurrent.

Figure 1A:
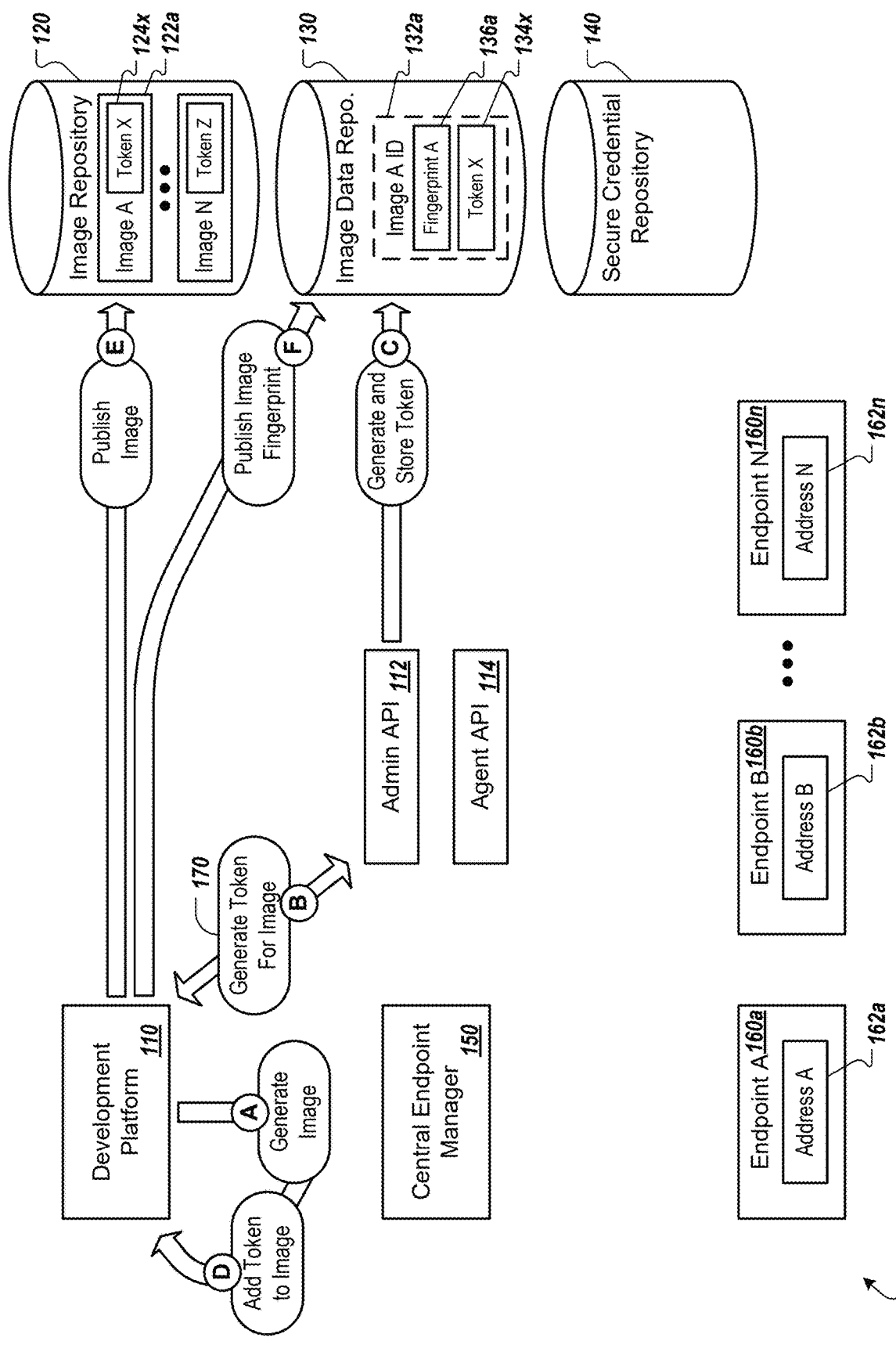
FIGS. 1A-1E depict an example illustrative system and process for generating endpoint images, reimaging endpoint devices, and securely managing credentials for the endpoint devices.

Referring now to FIG. 1A, the system 100 can include a development platform 110 that is configured to generate immutable images that include operating systems and various software applications for various endpoint devices 160a-n, and a central endpoint manager 150 that is configured to control the deployment of the immutable images to the endpoint devices 160a-n. The development platform 110 and the central endpoint manager 150, for example, can each generally represent various forms of computing servers, including but not limited to network servers, web servers, application servers, or other computing servers, and can each include one or more computing server devices. In alternate examples, the development platform 110 and the central endpoint manager 150 can be combined, or various server functions can be distributed to one or more additional servers. The endpoint devices 160a-n, for example, can each represent various forms of stationary or mobile computing devices that each includes one or more processors, memory, and data storage devices. The system 100 of the present example also includes various data repositories (e.g., including databases, file-based data repositories, cached data sources, etc.), including an image repository 120, an image data repository 130, and a secure credential repository 140. In alternate examples, two more of the data repositories 120, 130, and 140 can be combined, or various data can be distributed to one or more additional data repositories. Communication between servers, endpoint devices, and data repositories of the system 100 can occur over one or more communication networks (not shown), including a local area network (LAN), wide area network (WAN), and or the Internet.

In some implementations, at least some system functions for generating, deploying, and managing device images can be performed using one or more application interfaces. For example, multiple different sets of APIs can be provided by the system 100 for performing the system functions, with each of the sets of APIs being configured to communicate with and handle requests for a different computing device (or type of computing device) in the system 100. In the present example, an admin API 112 is provided for communicating with and handling requests from the development platform 100 and the endpoint manager 150, and an agent API 114 is provided for communicating with and handling requests from each of the endpoint devices 160a-n. Backend code for performing functions of the APIs 112, 114, for example, can be executed on a same server or server cluster (not shown), or can be executed on different servers or different server clusters (not shown). By maintaining separate APIs for handling requests from particular computing devices (or types of computing devices), for example, a separation of functionality and data can be maintained throughout the system 100, thus simplifying access to the APIs and improving system security.

In general, the stages (A) to (F) shown in FIG. 1A can occur when generating and preparing a runtime image for execution by an endpoint device (or multiple endpoint devices). During stage (A), the development platform 110 generates an image for an endpoint device. For example, the development platform 110 can be used to generate an immutable image that includes an operating system and various software applications for use by a particular endpoint device (e.g., a particular one of the endpoint devices 160a-n), or by a type of endpoint device (e.g., any of the endpoints 160a-n, with each of the endpoints 160a-n being functionally and structurally similar). Generating the immutable image, for example, can include accessing one or more repositories that include an operating system and/or application code that is configured for execution on the endpoint device, and performing a build that includes the operating system and the various software applications. Generation of the immutable image can generally be performed when security patches and functional updates become available for the operating system and/or various software applications to be executed by the endpoint device.

In some implementations, endpoint devices can be terminal devices that are configured to facilitate the exchange of information and the performance of transactions. For example, each of the endpoint devices 160a-n can be a point of sale (POS) device (e.g., a point of sale register, a self-checkout station, etc.) in a retail environment. In such implementations in which a terminal device is configured as a POS device (e.g., a checkout device in a retail environment), the terminal device can include a display (e.g., a touchscreen display, or a non-touchscreen display combined with a user input device, such as a keypad or voice interface), a terminal housing to which and/or within which the various components are mounted, and one or more placement areas (e.g., for placing and bagging products during a checkout process). Peripherals of the endpoint devices 160a-n, for example, can include a scale for weighing items during a checkout process, a scanner for scanning the items (e.g., using barcodes, radio frequency tags, object recognition, etc.), a printer for printing a receipt of a sale, a payment terminal for processing a customer's form of payment (e.g., a credit card, a gift card, etc.), and other suitable peripheral devices. In the present example, the image generated by the development platform 110 can include an operating system and various software applications to be executed by the endpoint devices 160a-n when functioning in the retail environment. Each of the endpoint devices 160a-n, for example, can be functionally and structurally similar, and can be uniquely identified through a respective address 162a-n (e.g., a media access control (MAC) address, or another suitable type of unique identifier).

During stage (B), the development platform 110 can transmit a request 170 for a token to be generated and stored for the generated image. The request 170, for example, can be provided through a call to an application programming interface (API) that is configured to handle requests for performing services related to the reimaging of endpoint devices 160a-n, and the secure management of credentials for the endpoint devices 160a-n. In the present example, the request 170 can be provided to the admin API 112, and can include an identifier of a particular image that has been generated by the development platform 110 (e.g., an identifier for "Image A").

During stage (C), a token can be generated and stored. For example, in response to receiving the request 170 from the development platform 110, the admin API 112 can generate a random token, and can store the generated random token in an image data repository 130, in association with an identifier of an image that had previously been generated by the development platform 110. In the present example, the image data repository 130 can store an identifier 132a for the generated image (e.g., an identifier for "Image A"), along with the generated token 134x ("Token X"). The image data repository 130, for example, can maintain various forms of identifying information related to images generated by the development platform 110.

During stage (D), a token can be added to a generated image. For example, the development platform 110 can receive the random token that has been generated by the admin API 112 (e.g., in response to the request 170 for token generation), and can add the random token to the previously generated image. In the present example, the development platform 110 can receive "Token X" from the admin API 112, and can add "Token X" to "Image A."

During stage (E), an immutable image can be published. For example, the development platform 110 can publish image 122a ("Image A") to which token 124x ("Token X") has been added, to an image repository 120. In the present example, the token 124x can be a copy of the token 134x, which is associated with the identifier 132a of "Image A" maintained by the image data repository 130. The image repository 120, for example, can maintain various immutable images that have been generated by the development platform 110 and that include randomly generated tokens (e.g., "Image A" including "Token X," "Image N" including "Token Z," etc.).

During stage (F), an image fingerprint can be published. For example, the development platform 110 can generate a fingerprint for the generated image and the added random token (e.g., using a fingerprinting algorithm that maps the image and token data to a relatively short bit string), and can publish the fingerprint to the image data repository 130, in association with an identifier of the image and the token. In the present example, fingerprint 136a ("Fingerprint A") can be stored in association with the identifier 132a of "Image A" and with token 134x ("Token X").

Although the present example depicts stages (D) through (F) being performed by the development platform 110, in other examples the stages can be performed through an application programming interface (API). For example, the image that has been generated by the development platform 110 during stage (A) can be provided to the admin API 112. Upon receiving the generated image, for example, the admin API 112 can alternately handle processes for generating and storing a token for the generated image (stage (C)), adding the generating token to the image (stage D), publishing the image (stage (E)), and generating and publishing the image fingerprint (stage (F)).

Figure 1B:
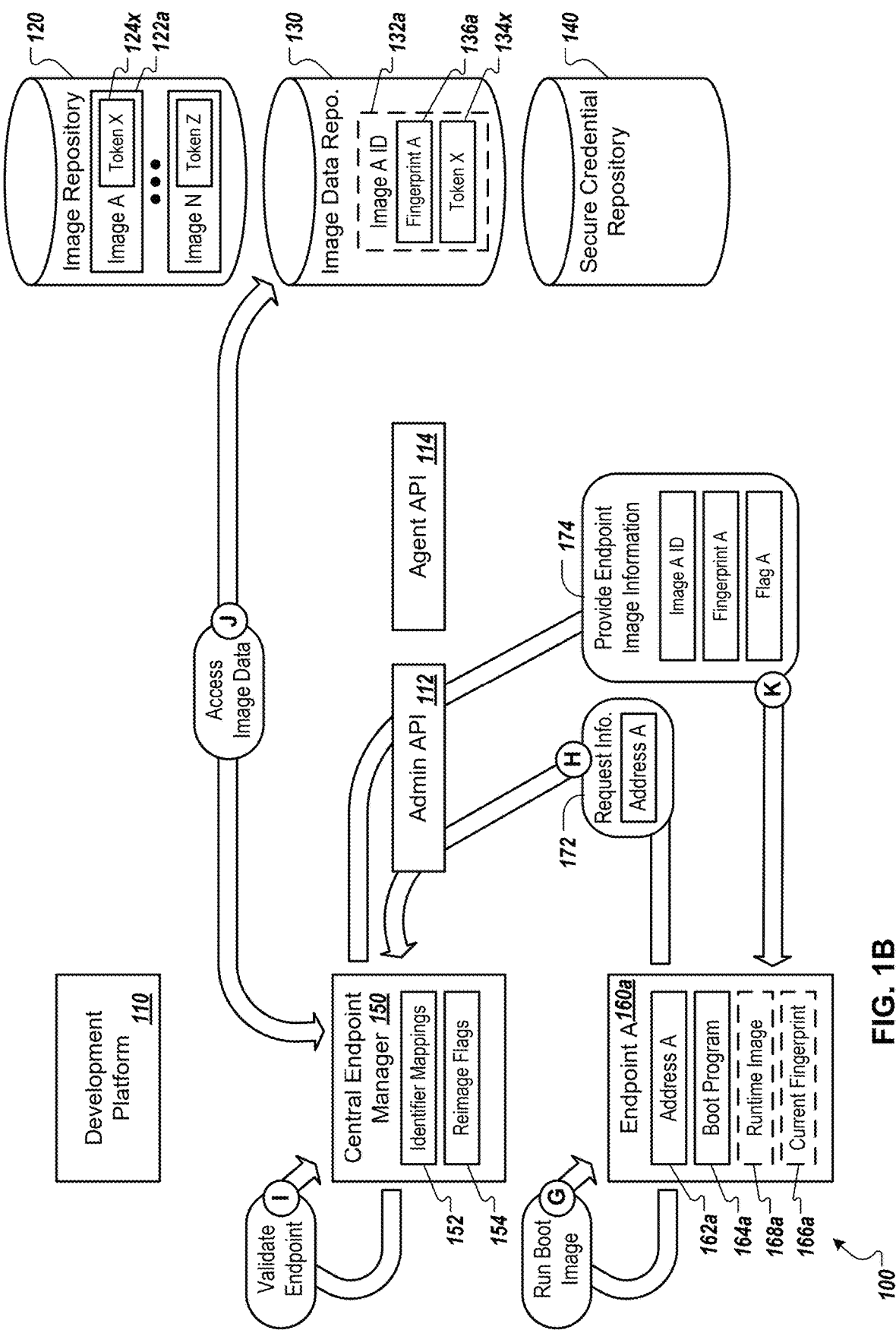

Referring now to FIG. 1B, stages (G) to (K) are shown, which can generally occur when an endpoint device starts up. During stage (G), an endpoint device can run a boot program to initiate a process for reimaging the device. For example, when the endpoint device 160a ("Endpoint A") starts up, the device can automatically execute boot program 164a that includes functionality for accessing application programming interfaces (APIs) over the network of the system 100. The boot program 164a, for example, can be accessed from local storage and/or can be provided through a network service (e.g., a pre-boot execution environment (PXE) that provides pre-boot services for the device's firmware that enables the endpoint device 160a to download the boot program 164a when starting).

During stage (H), the endpoint device can transmit a request for information related to a most recently generated runtime image for the device. For example, the endpoint device 160a ("Endpoint A") can transmit a request 172 for information to the admin API 112, that includes the address 162a ("Address A") of the device 160a. In the present example, mechanisms for interfacing with the admin API 112 can be included in the boot program 164a being executed by the endpoint device 160a.

During stage (I), the endpoint device can be validated. For example, the admin API 112 can coordinate a validation of the endpoint device 160a ("Endpoint A") by the central endpoint manager 150, which can search for the address of the endpoint device 160a in a set of identifier mappings 152 that are maintained by the central endpoint manager 150. The set of identifier mappings 152, for example, can include, for each endpoint device in the system 100 (e.g., each of the endpoint devices 160a-n, shown in FIG. 1A), a corresponding address of the endpoint device, and a corresponding identifier for a runtime image that has previously been generated by the development platform 110 (e.g., during stage (A), also shown in FIG. 1A) and that is intended for execution by the respective endpoint device. If an identification address is not found for an endpoint device (e.g., the endpoint device 160a is not recognized as being part of the system 100), the process for reimaging the device can be terminated. If the identification address is found for the endpoint device (e.g., the endpoint device 160a is recognized as being part of the system 100 and a generated runtime image for the device 160a exists), the process for reimaging the device can continue.

During stage (J), data that pertains to the most recently generated runtime image for the endpoint device can be accessed. For example, the central endpoint manager 150 can access data that pertains to a runtime image for the endpoint device 160a ("Endpoint A"), by using the identification address ("Address A") of the device 160a to identify a corresponding runtime image for the device 160a in the identifier mappings 152, and by using the identifier of the corresponding runtime image to access related data in the image data repository 130. In the present example, the corresponding runtime image for the endpoint device 160a can be identified through the image identifier 132a ("Image A ID"), and the related data can include the fingerprint 136a ("Fingerprint A") that was previously generated and published to the image data repository 130 as part of a process for generating the image 122a ("Image A"). Further, in the present example, the central endpoint manager 150 can reference a set of reimage flags 154 that indicate whether reimaging is to be performed for particular endpoint devices. For example, if a particular endpoint device were to have a security vulnerability (e.g., a root password for the device has been used, the device has been subject to a detected network attack, the device has not been reimaged for a threshold amount of time, etc.), a flag can be set for the particular device to trigger a reimaging of the device, regardless of whether a new version of the device's runtime image has been generated.

During stage (K), information that pertains to the runtime image for the endpoint device can be provided to the endpoint device. For example, the admin API 112 can coordinate the provision of information 174 to the endpoint device 160a ("Endpoint A"), based on the data that has been retrieved by the central endpoint manager 150. In the present example, the information 174 can include an image identifier of a current runtime image (e.g., "Image A ID") that is intended for execution by the endpoint device 160a, a fingerprint of the current runtime image (e.g., "Fingerprint A"), and an optional flag (e.g., "Flag A") that can automatically trigger a reimaging of the device.

Although the present example depicts stages (I) and (J) as being performed by the central endpoint manager 150, in other examples, one or more of the stages can be performed through an application programming interface (API). For example, the admin API 112 can alternately handle a process for validating an endpoint device (stage I). As another example, the admin API 112 can alternately handle a process for accessing data that pertains to a runtime image for the endpoint device (stage J).

Figure 1C:
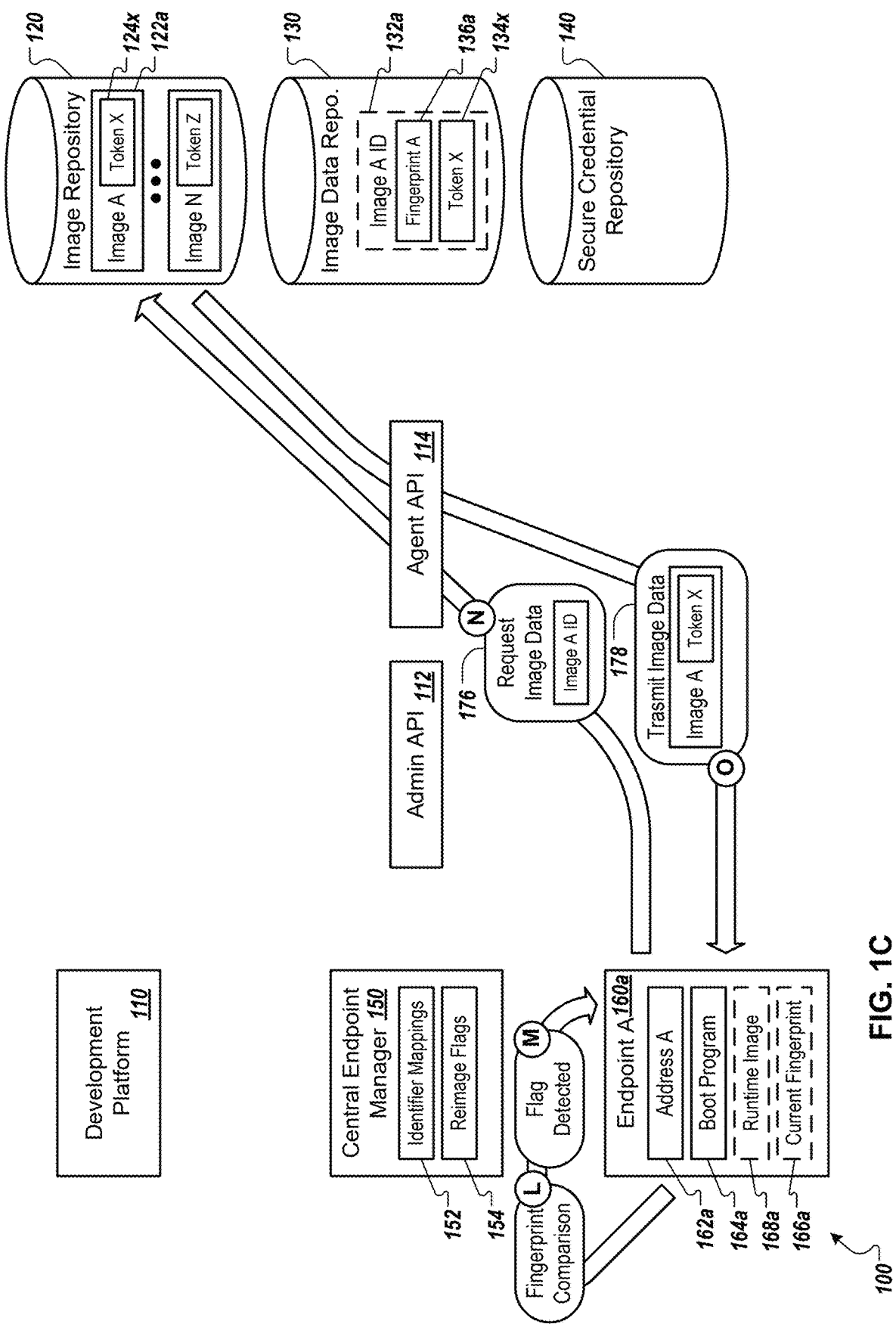

Referring now to FIG. 1C, stages (L) to (O) are shown, which can generally occur when determining whether to reimage an endpoint device, and when preparing the endpoint device for reimaging. During stage (L), a fingerprint comparison can be performed. For example, the endpoint device 160a ("Endpoint A") can compare a current fingerprint 166a of a current runtime image 168a employed by the device 160a to the fingerprint 136a ("Fingerprint A") of a most recently generated version of the runtime image (e.g., the image 122a, "Image A") that is intended for execution by the endpoint 160a. In some scenarios (e.g., when an endpoint device is newly added to the system 100, after an endpoint device has wiped, or another sort of scenario), a current fingerprint 166a and a currently employed runtime image 168a may not exist at the endpoint device 160a.

During stage (M), an optional flag for automatically triggering a reimaging of an endpoint device can be detected. For example, the endpoint device 160a ("Endpoint A") can detect a flag that has previously been set to trigger a reimaging of the endpoint device 160a, regardless of whether the device 160a currently has a most recently generated version of the runtime image that is intended for execution by the device 160a. In some scenarios (e.g., when a security vulnerability for the endpoint device 160a is not present and the device 160a is permitted to potentially use the current runtime image 168a), the automatic trigger flag can be omitted.

During stage (N), an endpoint device can transmit a request for a most recently generated runtime image that is intended for execution by the endpoint device. For example, the endpoint device 160a ("Endpoint A") can transmit a request 176 for image data to the agent API 114, that includes the identifier 132a ("Image A ID") of the most recently generated runtime image that is intended for execution by the device 160a. The identifier 132a of the most recently generated runtime image can be the identifier that was received by the device 160a as part of the information 174 received during stage (K) (shown in FIG. 1B), for example.

In general, a request for a runtime image can be transmitted in response to various scenarios that may pertain to an endpoint device. In one possible scenario, the endpoint device 160a may be a device that has been newly added to the system 100 (and has been registered with the central endpoint manager 150 and represented in the identifier mappings 152). For such a scenario, the endpoint device 160a may not currently have a runtime image 168a or a current fingerprint 166a, and thus the fingerprint comparison (e.g., performed during stage (L)) fails when the device 160a starts up. In another possible scenario, a runtime image that is intended for execution by the endpoint device 160a may be generated while the device 160a is operating. For such a scenario, the fingerprint comparison fails when the endpoint device 160a reboots, as the current fingerprint 166a does not match the fingerprint 136a received in the endpoint information 174 (e.g., during stage (K), shown in FIG. 1B). In another possible scenario, a flag may be provided by the central endpoint manager 150 and detected by the endpoint device 160a that indicates that a reimaging of the device 160a is to be performed on device startup, regardless of whether the runtime image 168a currently employed by the device 160a is the most recently generated runtime image for the device 160a. Such a scenario may apply when the endpoint device 160a is determined as having a security vulnerability (e.g., a root password for the device has been used, the device has been subject to a detected network attack, the device has not been reimaged for a threshold amount of time, etc.). In another possible scenario, the request for the most recently generated runtime image may be transmitted every time that the endpoint device 160a starts up, without performing the fingerprint comparison (e.g., stage (L)) or the flag detection (e.g., stage (M)). For example, the runtime image 168a may be relatively lightweight and/or an amount of time for reimaging the endpoint device 160a may be relatively short, such that reimaging the device on every startup is a feasible option.

During stage (O), the most recently generated version of the runtime image that is intended for execution by the endpoint device can be transmitted to the endpoint device. For example, the agent API 114 can use the image identifier 132a ("Image A ID") included in the request 176 to locate the image 122a ("Image A") in the image repository 120. Upon locating the image 122a, for example, the agent API 114 can transmit image data 178 including the image 122a ("Image A") and its corresponding token 124x ("Token X") to the endpoint device 160a.

Figure 1D:
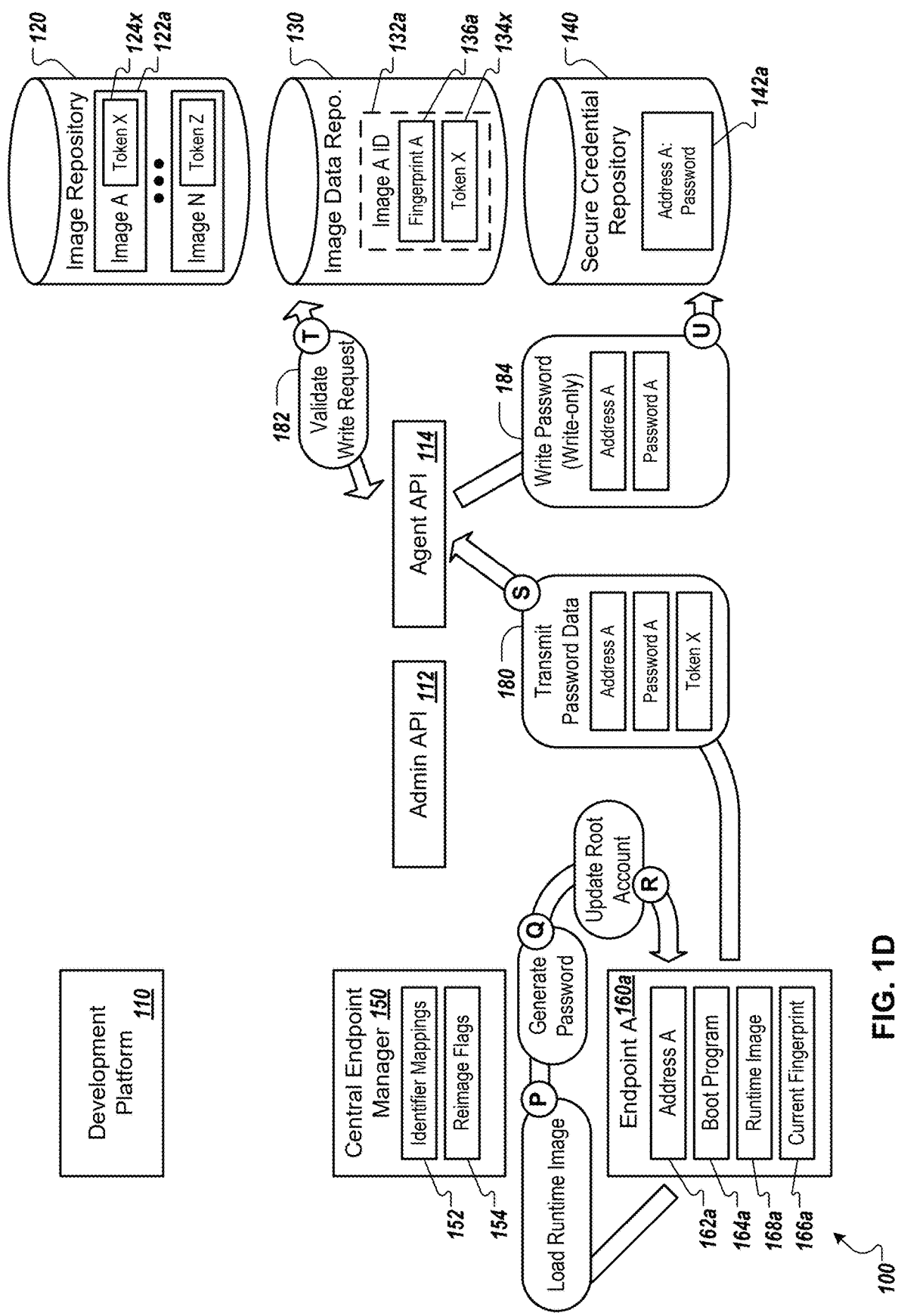

Referring now to FIG. 1D, stages (P) to (U) are shown, which can generally occur when reimaging an endpoint device, and when generating and securing a root password for the endpoint device. During stage (P), the most recently generated version of the runtime image can be loaded. For example, the endpoint device 160a ("Endpoint A") can use the boot program 164a to update the locally maintained runtime image 168a with the image 122a that had been included in the image data 178 that was transmitted to the device 160a during stage (O) (shown in FIG. 1C). In some implementations, prior to loading the runtime image, the image can be fingerprinted and validated. For example, the boot program 164a of the endpoint device 160a can be used to generate a new fingerprint of the received runtime image (e.g., image 122a), and the new fingerprint can be compared with the previously received fingerprint (e.g., the fingerprint received with the information 174 during stage (K) (shown in FIG. 1B). If the newly generated fingerprint matches the previously received fingerprint, for example, the runtime image received by the endpoint device 160a can be determined as being valid. The newly generated fingerprint (or the previously received fingerprint) can be updated as the current fingerprint 166a.

During stage (Q), a root password for the endpoint device can be generated, and during stage (R), a root account for the endpoint device can be updated to include the generated root password. For example, the endpoint device 160a ("Endpoint A") can use the boot program 164a or an application included in the runtime image 168a to automatically (e.g., without user input) and randomly generate a root password that can be used to grant administrative privileges of the device 160a. In general, the root password is not to be provided to regular users of the endpoint device 160a (who are given user passwords to operate applications executed by the device), but is instead to be used during scenarios that warrant root-level access to the device 160a, such as application debugging scenarios, network security investigation scenarios, or other such scenarios. As use of the root password is reserved for highly specific and sensitive scenarios (which may or may occur while a current runtime image is in place), mechanisms are provided (e.g., during stages(S), (T), and (U)) for securing the root password and potentially never revealing the root password to a human, unless explicitly requested by an authorized system administrator or authorized operator.

During stage(S), the generated root password for the endpoint device can be provided to an application programming interface (API) for secure storage. For example, the endpoint device 160a ("Endpoint A") can transmit password data 180 to the agent API 114 including the address of the device 160a ("Address A"), the generated root password ("Password A"), and the previously received token (token 124x, "Token X") that was provided along with the runtime image (image 122a, "Image A") that has been loaded on the device 160a. The token 124x ("Token X"), for example, can be used to gain write-only access to the secure credential repository 140.

During stage (T), a write request can be validated. For example, the agent API 114 can perform a validation 182 of the write request. The validation 182, for example, can include determining whether the token 124x ("Token X") included in the password data 180 transmitted by the endpoint device 160a to the agent API 114 is a valid token for a most recently generated version of a runtime image that is intended for execution by the device 160a (e.g., by comparing the token to the corresponding token 134x ("Token X") maintained by the image data repository 130. Validation 182 of the write request, for example, can be performed to ensure that a malicious actor is not attempting to add garbage data to the secure credential repository 140. If the token 124x is valid, for example, the write request for securing the root password can be granted and the process may continue.

During stage (U), the write request can be executed. For example, the agent API 114 can write password data 184 to the secure credential repository 140, including the address ("Address A") for the endpoint device 160a ("Endpoint A"), along with the generated root password ("Password A") for the device 160a. A stored root password 142a, for example, can remain secure in the secure credential repository 140 in association with its corresponding endpoint device address, until such time that the password 142a is requested by an authorized system administrator or device operator. A request for retrieving the root password can be handled through a different application programming interface (API) than the request for storing the password and/or can be granted through a different access mechanism, thus ensuring password security. One example of such a process for accessing password 142a can include a "break the glass" operation in which the write-only (i.e., read prohibited)

restrictions on the memory storing the password 142a in the secure credential repository 140 (i.e., access controls for the password 142a) can be circumvented with sufficient authorization of credentials for the requesting user. Some break the glass operations can include, for example, multiple layers of validation and authentication, including potentially physical access to one or more terminals associated with the repository 140.

Figure 1E:
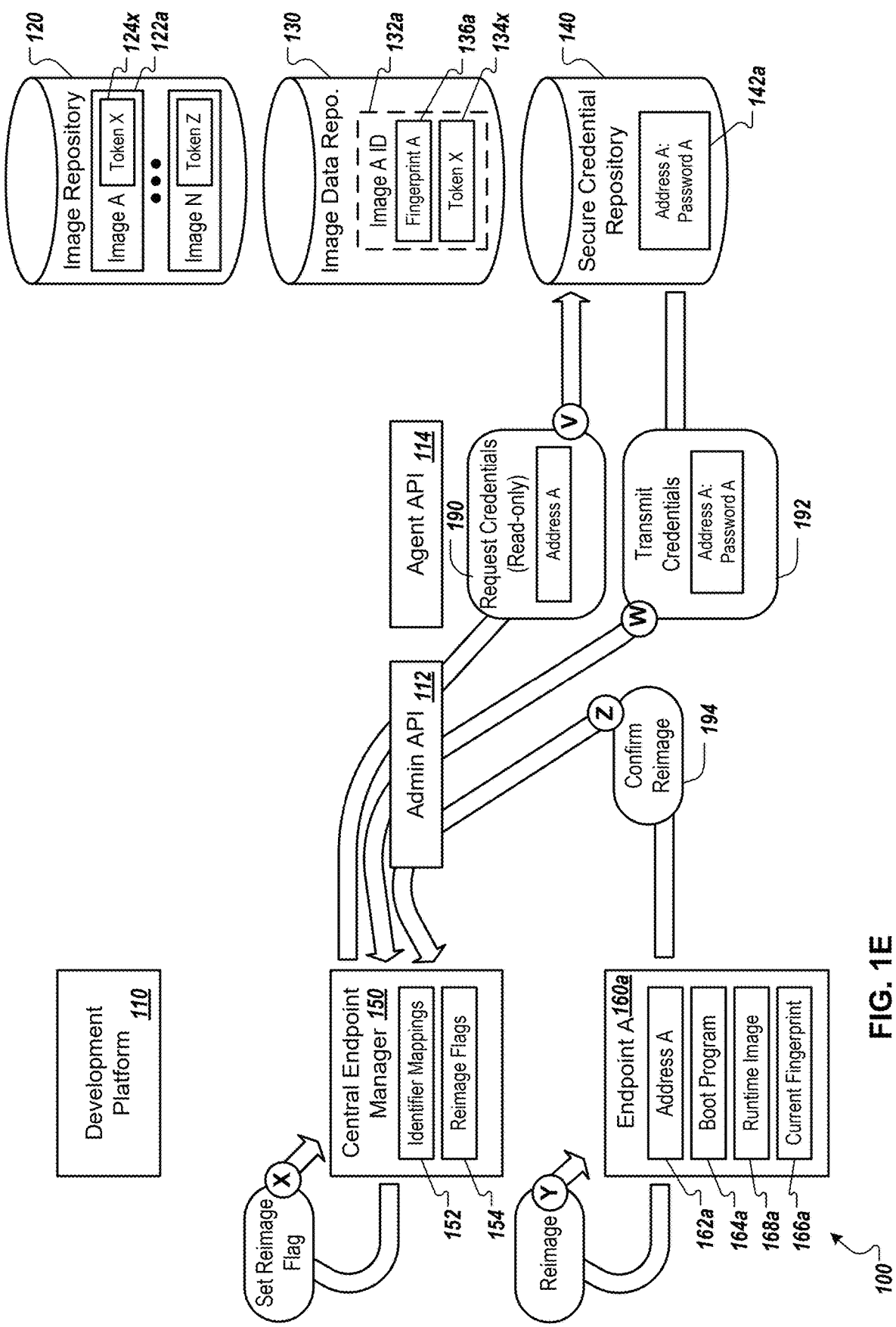

Referring now to FIG. 1E, stages (V) to (Z) are shown, which can generally occur when gaining access to a secured root password of an endpoint device, and when preparing the endpoint device for reimaging in response to access of the secured root password. During stage (V), a read-only request can be transmitted for access credentials of an endpoint device. For example, the central endpoint manager 150 can transmit a read-only request 190 for access credentials of the endpoint device 160a ("Endpoint A"), using the admin API 112. The read-only request 190, for example, can include an identifier ("Address A") of the endpoint device 160a, and can include a security mechanism (e.g., an access token or another security mechanism) that is specific to the central endpoint manager 150. That is, the central endpoint manager 150 (or another authorized device) may be permitted to interface with the admin API 112 for the purpose of acquiring the credentials of endpoint devices, whereas non-authorized devices may not be permitted to interface with the admin API 112.

During stage (W), the read-only request can be granted, and the access credentials of the endpoint device can be returned. For example, the admin API 112 can access the secure credential repository 140, and can use the identifier ("Address A") of the endpoint device 160a ("Endpoint A") to retrieve the root password 142a ("Password A") of the device 160a. After retrieving the root password 142a, for example, the admin API 112 can securely transmit the access credentials 192 (including the root password 142a) for the endpoint device 160a to the central endpoint manager 150. Optionally, the system 100 can include additional security measures (e.g., two factor authentication or other suitable security measures) when returning a root password of an endpoint device.

In general, after receiving access credentials of an endpoint device, various sorts of operations can be performed that involve administrative access privileges of the endpoint device. For example, the root password 142a can be used to gain administrative access to the endpoint device 160a ("Endpoint A"), in order to debug an application running on the device 160a, to investigate a security incident that may have occurred on the device 160a, or to perform another sort of operation for which administrative access privileges are needed. However, once the root password 142a of the endpoint device 160a has been accessed, the device 160a may no longer be considered as a secure device. That is, a malicious actor could potentially acquire the root password 142a after it has been released by the secure credential repository 140 and it has been used to gain administrative access privileges to the endpoint device 160a. To ensure that the root password 142a is not maliciously used, for example, the system 100 can prepare for and perform another reimaging of the endpoint device 160a (e.g., during stages (X) to (Z)).

During stage (X), a reimage flag is set for the endpoint device. For example, immediately after acquiring the root password 142a ("Password A") of the endpoint device 160a ("Endpoint A"), or after performing an action for which administrative access privileges are needed, the central endpoint manager 150 can set a reimage flag for the device 160a in the set of reimage flags 154. The reimage flag, for example, can serve as a trigger for causing a reimaging of the endpoint device 160a when the device 160a is rebooted.

During stage (Y), the endpoint device is reimaged. When rebooting, for example, a series of interactions can be performed between the endpoint device 160a ("Endpoint A") and the central endpoint manager 150 in which the reimage flag is detected and the device 160a is reimaged. Operations for detection of the reimage flag, reimaging the device, and generating and storing a new root password for the endpoint device 160a are described in further detail with respect to the stages (G) to (U), shown in FIGS. 1B-1D.

During stage (Z) a confirmation of the reimaging of the endpoint device can optionally be provided. For example, after the endpoint device 160a ("Endpoint A") has been reimaged, the device 160a can provide a notification 194 that the reimaging has been completed (e.g., via the admin API 112). After receiving the notification 194, for example, the central endpoint manager 150 can clear the reimage flag for the endpoint device 160a from the set of reimage flags 154 until such time that another reimaging of the device 160a is to be triggered.

Figure 2:
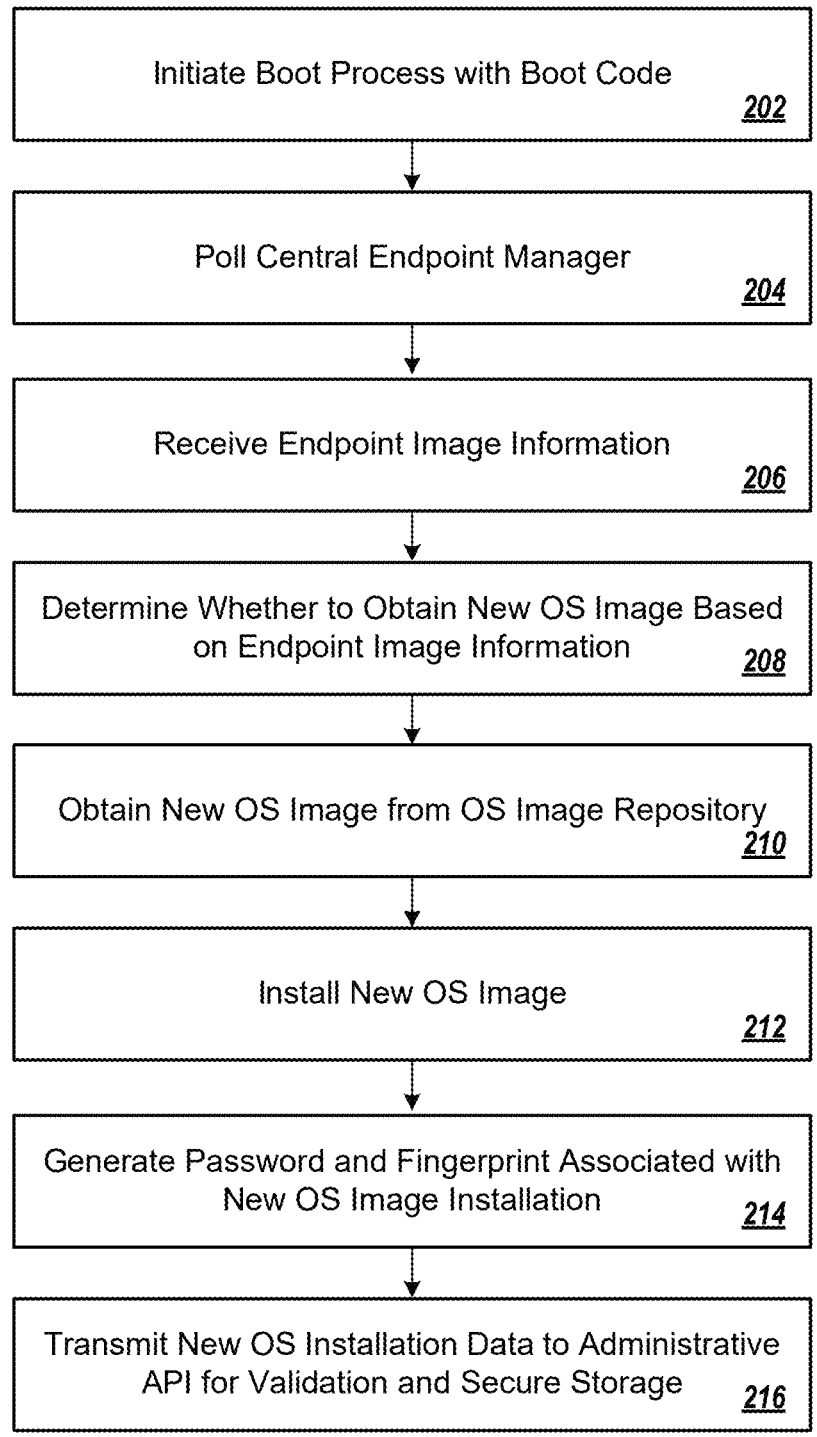
FIG. 2 is a flow diagram of an example technique for generating secure credentials for an endpoint device.

FIG. 2 is a flow diagram of an example technique 200 for generating secure credentials for an endpoint device. The example technique 200 can be performed by any of a variety of appropriate computing devices, such as by the endpoint devices A-N 160a-n described above with regard to FIGS. 1A-E. Additionally, the example technique 200 can be performed as part of systems and other techniques described throughout this document, such as the example system 100 and the process stages (A)-(Z) that are described above with regard to FIGS. 1A-E.

A boot process for an endpoint device can be initiated with boot code, which can be stored in read-only memory of the endpoint device (step 202). For example the boot code can be part of a boot program 164a that is configured to run the boot image of stage (G), as discussed above with regard to endpoint 160a and FIG. 1B. The boot process can include code portions that cause the endpoint device to automatically poll a central endpoint manager (step 204). For example, the endpoint 160a can poll the central endpoint manager 150 with a request that includes the address of endpoint 160a, as indicated by stage (H). The central endpoint manager receiving the polling request, such as the central endpoint manager 150, can perform a variety of operations in response to the request, such as validating the endpoint (stage (I)), accessing the image data from the image data repository 130 (stage (J)), and providing endpoint image information to the endpoint (stage (K)).

The endpoint can receive the endpoint image information (step 206) and determine whether to obtain a new OS image for the endpoint based on the endpoint image information (step 208). For example, the endpoint 160a can perform a fingerprint comparison (stage (L)) and/or a flag detection operation (stage (M)) with regard to the received endpoint image information, which can include an image ID for the new OS image, a fingerprint for the endpoint, and a flag for the endpoint that can be maintained by the central endpoint manager 150. A fingerprint mismatch between the current fingerprint 166a for the endpoint 160a and a stored fingerprint for the endpoint (as stored in the image data repository 130) can cause an automatic determination by the endpoint 160a to request a new OS image from the image repository 120. Similarly, a flag being detected in the endpoint image information can cause an automatic determination by the endpoint 160a to request a new OS image from the image repository 120.

Upon making a determination that a new image should be installed, that endpoint can request and receive a new OS image for the endpoint (step 210). For example, the endpoint 160*a* can transmit a request (stage (N)) and receive a response from the image repository with the new OS image data (stage (O)), which can include a secure token used to validate the OS image and corresponding secure password storage. The new image can be the same image that is already installed on the endpoint 160*a*, and the act of installing the new image can include reinstalling the OS from the immutable image stored in the image repository 120. The new image may also be a different version of the OS and, as a result, can be a new OS image that is different from the current OS image installed on the device. In such instances, installing the new image can include upgrading the OS version.

Once the new image is obtained, the new OS image can be installed on the endpoint (step 212). For example, endpoint 160*a* can load and install the runtime image 168*a* as part of stage (P). A new password can be generated for the endpoint and a fingerprint for the current version of the endpoint post installation can be created (step 214). For example, the endpoint 160*a* can generate a new password that is used to update the root account on the endpoint 160*a* (stages (Q) and (R)). Similarly, the current fingerprint 166*a* of the endpoint 160*a* can be updated once the new OS image has been installed and the new password, with root permissions, has been generated.

The new OS installation data can be transmitted to the administrative and/or agent API for validation and secure storage (step 216). For example, the password data can be transmitted by the endpoint 160*a* as part of stage(S) for validation through the image data repository 130 using the token and address of the endpoint, and upon validation the new password for the endpoint 160*a* can be securely stored in the secure credential repository 140. Once validated, a fingerprint for the endpoint 160*a* can additionally be stored in the image data repository 130, which can be used to validate whether the configurations and/or operation of the endpoint 160*a* subsequently change after the installation of the new OS image.

Figure 3:
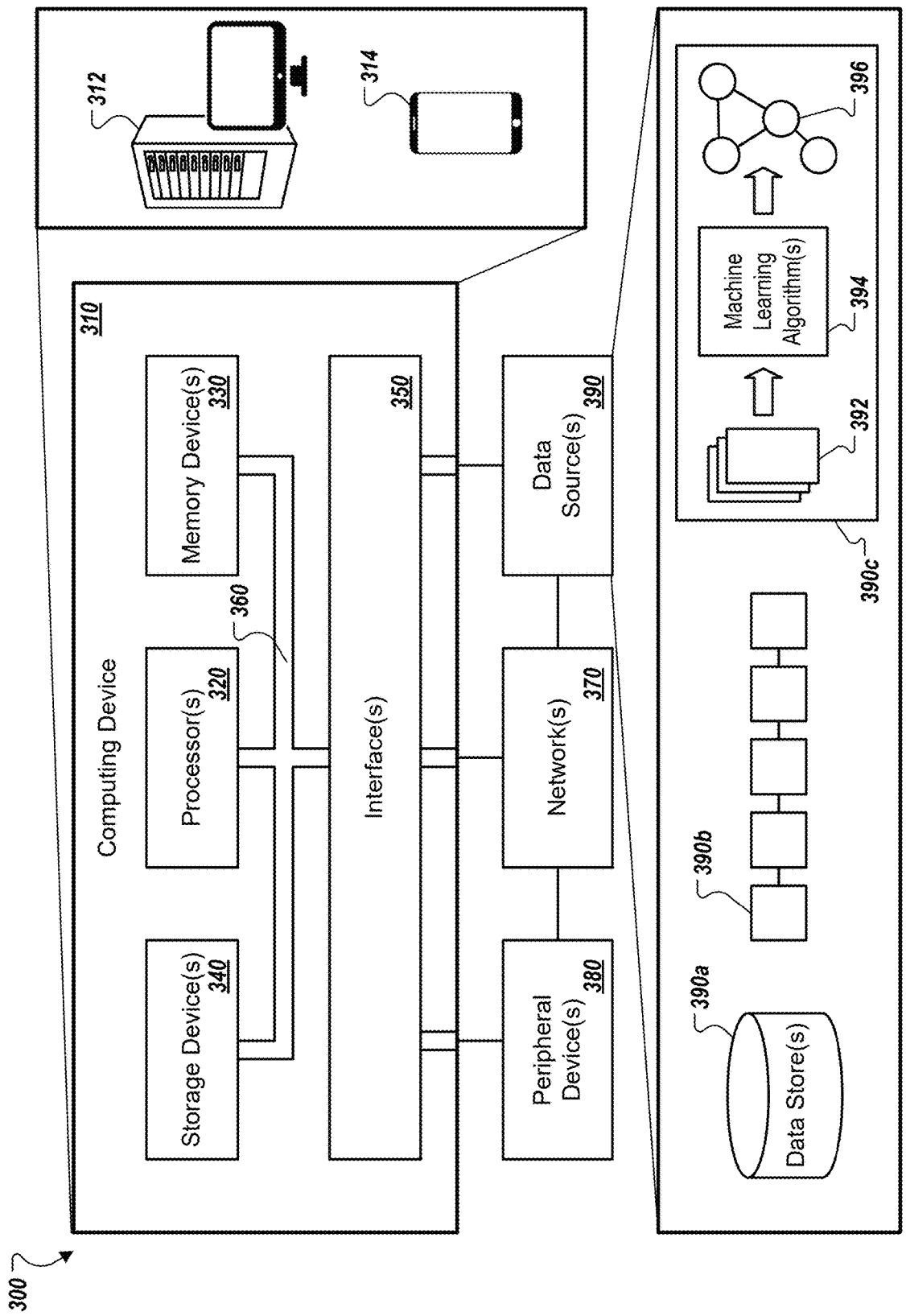
FIG. 3 is a schematic diagram that shows an example of a computing system.

FIG. 3 is a schematic diagram that shows an example of a computing system 300 that can be used to implement the techniques described herein. The computing system 300 includes one or more computing devices (e.g., computing device 310), which can be in wired and/or wireless communication with various peripheral device(s) 380, data source(s) 390, and/or other computing devices (e.g., over network(s) 370). The computing device 310 can represent various forms of stationary computers 312 (e.g., workstations, kiosks, servers, mainframes, edge computing devices, quantum computers, etc.) and mobile computers 314 (e.g., laptops, tablets, mobile phones, personal digital assistants, wearable devices, etc.). In some implementations, the computing device 310 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 310, and an entire system can be made up of multiple devices communicating with each other. For example, the computing device 310 can be part of a computing system that includes a network of computing devices, such as a cloud-based computing system, a computing system in an internal network, or a computing system in another sort of shared network. Processors of the computing device (310) and other computing devices of a computing system can be optimized for different types of operations, secure computing tasks, etc. The components shown herein, and their functions, are meant to be examples, and are not meant to limit implementations of the technology described and/or claimed in this document.

The computing device 310 includes processor(s) 320, memory device(s) 330, storage device(s) 340, and interface(s) 350. Each of the processor(s) 320, the memory device(s) 330, the storage device(s) 340, and the interface(s) 350 are interconnected using a system bus 360. The processor(s) 320 are capable of processing instructions for execution within the computing device 310, and can include one or more single-threaded and/or multi-threaded processors. The processor(s) 320 are capable of processing instructions stored in the memory device(s) 330 and/or on the storage device(s) 340. The memory device(s) 330 can store data within the computing device 310, and can include one or more computer-readable media, volatile memory units, and/or non-volatile memory units. The storage device(s) 340 can provide mass storage for the computing device 310, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 350 can include various communications interfaces (e.g., USB, Near-Field Communication (NFC), Bluetooth, WiFi, Ethernet, wireless Ethernet, etc.) that can be coupled to the network(s) 370, peripheral device(s) 380, and/or data source(s) 390 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 350 can include a control interface that receives commands from an input device (e.g., operated by a user) and converts the commands for submission to the processors 320. The interface(s) 350 can include a display interface that includes circuitry for driving a display to present visual information to a user. The interface(s) 350 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 370 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 310 can communicate with the peripheral device(s) 380, the data source(s) 390, and/or other computing devices over the network(s) 370. In some implementations, the computing device 310 can directly communicate with the peripheral device(s) 380, the data source(s), and/or other computing devices.

The peripheral device(s) 380 can provide input/output operations for the computing device 310. Input devices (e.g., keyboards, pointing devices, touchscreens, microphones, cameras, scanners, sensors, etc.) can provide input to the computing device 310 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 310 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 390 can provide data for use by the computing device 310, and/or can maintain data that has been generated by the computing device 310 and/or other devices (e.g., data collected from sensor devices, data aggregated from various different data repositories, etc.). In some implementations, one or more data sources can be hosted by the computing device 310 (e.g., using the storage device(s) 340). In some implementations, one or more data sources can be hosted by a different computing device. Data can be provided by the data source(s) 390 in response to a request for data from the computing device 310 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 390*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 390*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 390*c*. The machine learning system(s) 390*c*, for example, can be used to analyze data from various sources (e.g., data provided by the computing device 310, data from the data store(s) 390*a*, data from the blockchain(s) 390*b*, and/or data from other data sources), to identify patterns in the data, and to draw inferences from the data patterns. In general, training data 392 can be provided to one or more machine learning algorithms 394, and the machine learning algorithm(s) can generate a machine learning model 396. Execution of the machine learning algorithm(s) can be performed by the computing device 310, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks. With respect to the technology described herein, the training data can include data that represents network security incidents that may occur across a network of endpoint devices. The machine learning model that results from the machine learning algorithm(s) can be used to automatically set reimaging flags for endpoint devices in response to the network security incidents. Use of the machine learning model can provide the benefit of improved detection of security incidents across the network and automated management of the endpoint devices.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for securely and automatically provisioning endpoint devices, wherein the system comprises:
    an administrative API that is configured to generate a token;
    an OS image repository that is configured to store and make available an immutable image of an operating system ("OS") that includes the token generated by the administrative API accessible over a network;
    a central endpoint manager that is configured to manage access to and provisioning of the OS;
    a secure credential repository that is configured to securely maintain credentials; and
    an endpoint device that includes memory and one or more processors, wherein the memory includes (i) a current OS image and (ii) read-only boot code, wherein the read-only boot code is configured to be executed automatically on booting of the endpoint device and that, when executed, performs operations comprising:
        obtaining a new OS image from the OS image repository, wherein the new OS image includes an associated token;
        installing the new OS image, including replacing the current OS image with the new OS image in the memory;
        generating a new password and a new fingerprint for the new OS image installed on the endpoint device, wherein the new fingerprint replaces a current fingerprint in the memory; and
        transmitting new OS installation data for the endpoint device to the administrative API, wherein the new OS installation data includes the new password, the associated token, and a unique identifier for the endpoint device;
    wherein the administrative API is configured (i) to validate the new OS installation data with the OS image repository and (ii) to perform a write-only operation to store the new password in the secure credential repository upon validation by the OS image repository.

2. The system of claim 1, wherein the operations further comprise:
    automatically polling, upon booting of the endpoint device, the central endpoint manager with a unique identifier for the endpoint device when booted;
    receiving endpoint image information from the central endpoint manager; and
    determining whether to obtain the new OS based on the endpoint image information;
    wherein the new OS is automatically obtained based on the determination.

3. The system of claim 2, wherein:
the memory of the endpoint device further includes the current fingerprint for the current OS image,
the endpoint image information includes the new fingerprint for the new OS image, and
the determining comprises comparing the current fingerprint for the current OS image and the new fingerprint for the new OS image.

4. The system of claim 3, wherein the new OS image is obtained in response to the current fingerprint being determined as different from the new fingerprint.

5. The system of claim 2, wherein:
the endpoint image information includes a flag directing installation of the new OS image, and
the determining comprises automatically obtaining the current OS image including the flag.

6. The system of claim 5, wherein the new OS image and the current OS image are a same OS version, and the installation of the new OS image comprises reimaging of the OS version for the endpoint device to an immutable image of the OS version represented by the new OS image.

7. The system of claim 6, wherein the central endpoint manager maintains a repository of flags for the endpoint device and other endpoint devices that direct automatic reimaging of the OS version on the next boot.

8. The system of claim 7, wherein the endpoint device is flagged for automatic reimaging with the central endpoint manager in response to a password for the endpoint device being accessed from the secure credential repository.

9. The system of claim 7, wherein the endpoint device is flagged for automatic reimaging with the central endpoint manager in response to the current fingerprint for the current OS image changing.

10. The system of claim 5, wherein the new OS image and the current OS image are different OS versions, and installation of the new OS image comprises changing to a newer OS version for the endpoint device represented by the new OS image.

11. The system of claim 1, further comprising:
a development platform that is configured to build the immutable image of the OS that includes, at least, OS code and the token generated by the administrative API.

12. The system of claim 1, wherein the unique identifier for the endpoint device comprises a MAC address for the endpoint device.

13. The system of claim 1, wherein:
the secure credential repository comprises memory and one or more processors,
the memory includes write-only memory that is configured to store the new password, and
the one or more processors of the secure credential repository are configured to only permit access to the write-only memory storing the new password through a break the glass operation.

14. The system of claim 13, wherein performance of the break the glass operation to access the new password for the endpoint device causes the endpoint device to be flagged for reimaging with the central endpoint manager.

15. The system of claim 1, wherein the administrative API is configured to perform the write-only operation in response to the new OS installation data being validated with the OS image repository.

16. The system of claim 15, wherein the OS image repository is configured to:
receive a request for validation of the new OS installation data, wherein the new OS installation data includes at least the associated token,
compare the associated token with the stored token that was generated by the administrative API, and
transmit confirmation of validation to the administrative API based on, at least, the comparison of the associated token and the stored token.

17. The system of claim 16, wherein the OS image repository is further configured to:
store the new fingerprint in association with the new OS image, and
provide the new fingerprint for validating that the new OS image installed on the endpoint device has not changed.

18. The system of claim 1, wherein the new password is only stored on the endpoint device and the secure credential repository.

19. The system of claim 1, wherein the endpoint device comprises a point of sale terminal in a retail environment.

20. The system of claim 1, wherein the endpoint device is further configured to automatically reboot on a recurring period of time, prompting performance of the operations during each reboot.

* * * * *